(12) United States Patent
Rossello et al.

(10) Patent No.: US 7,460,671 B1
(45) Date of Patent: Dec. 2, 2008

(54) ENCRYPTION PROCESSING APPARATUS AND METHOD FOR VOICE OVER PACKET NETWORKS

(75) Inventors: Norbert Rossello, Biot (FR); Fabien Klein, Antibes (FR)

(73) Assignee: Mindspeed Technologies, Inc., Newport Beach, CA (US)

(*) Notice: Subject to any disclaimer, the term of this patent is extended or adjusted under 35 U.S.C. 154(b) by 828 days.

(21) Appl. No.: 10/600,930

(22) Filed: Jun. 19, 2003

(51) Int. Cl.
*H04K 1/00* (2006.01)

(52) U.S. Cl. .................. 380/275; 380/255; 380/277; 709/227

(58) Field of Classification Search .................. None
See application file for complete search history.

(56) References Cited

U.S. PATENT DOCUMENTS 6,918,034 B1 * 7/2005 Sengodan et al. ........... 713/160
6,934,756 B2 * 8/2005 Maes ......................... 709/227
2003/0128696 A1 * 7/2003 Wengrovitz et al. ......... 370/352
2003/0219128 A1 * 11/2003 Luby ......................... 380/255

* cited by examiner

*Primary Examiner*—Kambiz Zand
*Assistant Examiner*—Roderick Tolentino
(74) *Attorney, Agent, or Firm*—Farjami & Farjami LLP

(57) ABSTRACT

In one aspect, a device includes an encoder configured to receive a speech sample and generate an encoded voice packet from the speech sample, the encoded voice packet having a packet size and a plurality of bytes. The device also includes an encryption unit configured to receive a voice block and generate an encrypted voice block, the voice block having a block size, wherein the packet size is not divisible by the block size and yields a remainder. The device further includes a packet block manager configured to divide the encoded voice packet into a plurality of the voice blocks and provide the plurality of the voice blocks to the encryption unit, the packet block manager further configured to create a remainder voice block including remainder bytes of the encoded voice packet and additional bytes from the encrypted voice block and provide the remainder voice block to the encryption unit.

12 Claims, 5 Drawing Sheets

ENCRYPTION PROCESSING APPARATUS AND METHOD FOR VOICE OVER PACKET NETWORKS

BACKGROUND OF THE INVENTION

1. Field of the Invention

The present invention relates generally to speech and audio signal processing. More particularly, the present invention relates to encrypted speech and audio signal processing.

2. Related Art

In a conventional voice-over-packet ("VoP") system or voice over IP ("VoIP") system, telephone conversations or analog voice may be transported over the local loop or the public switched telephone network ("PSTN") to the central office ("CO"), where speech is digitized according to an existing protocol, such as G.711. From the CO, the digitized speech is transported to a gateway device at the edge of the packet-based network. The gateway device receives the digital speech and packetizes it. The gateway device can combine G.711 samples into a packet, or use any other compressing scheme. Next, the packetized data is transmitted over the packet network, such as the Internet, for reception by a remote gateway device and conversion back to analog voice in the reverse manner as described above.

For purposes of this application, the terms "speech coder" or "speech processor" will generally be used to describe the operation of a device that is capable of encoding speech for transmission over a packet-based network and/or decoding encoded speech received over the packet-based network. As noted above, the speech coder or speech processor may be implemented in a gateway device for conversion of speech samples into a packetized form that can be transmitted over a packet network and/or conversion of the packetized speech into speech samples.

More recently, there has emerged an interest to provide secure voice calls over packet networks through encrypted voice technology. With voice encryption, speech data is converted into encrypted voice data in a form which cannot be understood by unauthorized users as it is transmitted over packet networks. Upon receipt, the encrypted voice data is decrypted into a form which can be understood by authorized users. A number of problems, however, are presented by current encryption techniques employing block-based algorithms. For example, currently deployed voice codecs generally encode speech samples into encoded packet sizes which are different from other voice codecs. Moreover, these various encoded packet sizes are to a large extent not proportional to the block sizes used for block-based encryption algorithms. This disparity between the block sizes of encoded voice packets and the block sizes used for block-based encryption algorithms results in voice transmission delays and/or increased packet loss, and, as a consequence, degrades VoP quality and performance.

By way of illustration, one conventional technique for handling the disparity between the block sizes of encoded voice packets and the block sizes used for block-based encryption algorithms is for the transmitter to wait for two successive encoded voice packets and to use data in the second encoded voice packet to make up for data lacking in the first encoded voice packet; in this way, a portion of the first encoded voice packet overlaps with a portion of the second encoded voice packet to generate an "overlap packet." However, this approach results in significant and unacceptable delay, particularly for codecs employing large encoded voice packet sizes. Furthermore, the receiver may also be required to wait for two encrypted packets associated with two successive encoded voice packets before being able to decrypt packets associated with one of the encoded voice packets, where for example, the speech sample block of the first encoded voice packet to be decrypted overlaps with a portion of the second encoded voice packet. Due to the large sizes of encoded voice packets, the additional wait time by the receiver severely degrades the receiving process. Moreover, in the event of packet loss of the overlap packet (a single packet), the speech data associated with both the first encoded voice packet and the second encoded voice packet (two packets) are lost, resulting in significantly increased packet loss as a result of the conventional technique described above.

Another problem with the conventional solution arises due the conventional technique of padding voice packets with addition data chosen using arbitrary methods in order to proportionally size the voice packet to the encryption unit block size. As a consequence, this padding technique increases the final encrypted voice packet size, resulting in degraded VoP performance.

Accordingly, there is a strong need in the art for an encryption processing apparatus and method which provides improved encryption data handling for voice of packet networks and can overcome the shortcomings in the art.

SUMMARY OF THE INVENTION

In accordance with the purposes of the present invention as broadly described herein, there is provided an encryption processing apparatus and method for voice over packet networks which results in significantly improved encryption data handling. In one exemplary embodiment of the present invention, a device includes an encoder configured to receive a speech sample and generate an encoded voice packet from the speech sample, the encoded voice packet having a packet size and a plurality of bytes. The device also includes an encryption unit configured to receive a voice block and generate an encrypted voice block, the voice block having a block size, wherein the packet size is not divisible by the block size and yields a remainder. The device further includes a packet block manager configured to divide the encoded voice packet into a plurality of first voice blocks each having the block size, and provide the plurality of first voice blocks to the encryption unit, the packet block manager further configured to create a remainder voice block having the block size and including remainder bytes of the encoded voice packet and additional bytes from the plurality of first voice blocks and provide the remainder voice block to the encryption unit.

In one aspect, the packet block manager applies a mask to said encrypted voice packet for determining said additional bytes. In another aspect, the packet block manager executes one of a recursive sliding block method algorithm and a recursive overlapping block method algorithm for determining said additional bytes.

According to other embodiments of the present invention, method and computer software product for handling encryption data in accordance with the above technique is provided. These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, speech coding and decoding and the like. Such general techniques that may be known to those skilled in the art are not described in detail herein.

It should be appreciated that the particular implementations shown and described herein are merely exemplary and are not intended to limit the scope of the present invention in any way. For example, the present invention may be implemented in a number of communication systems arrangements, including wired and/or wireless system arrangements. For the sake of brevity, conventional data transmission, speech encoding, speech decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
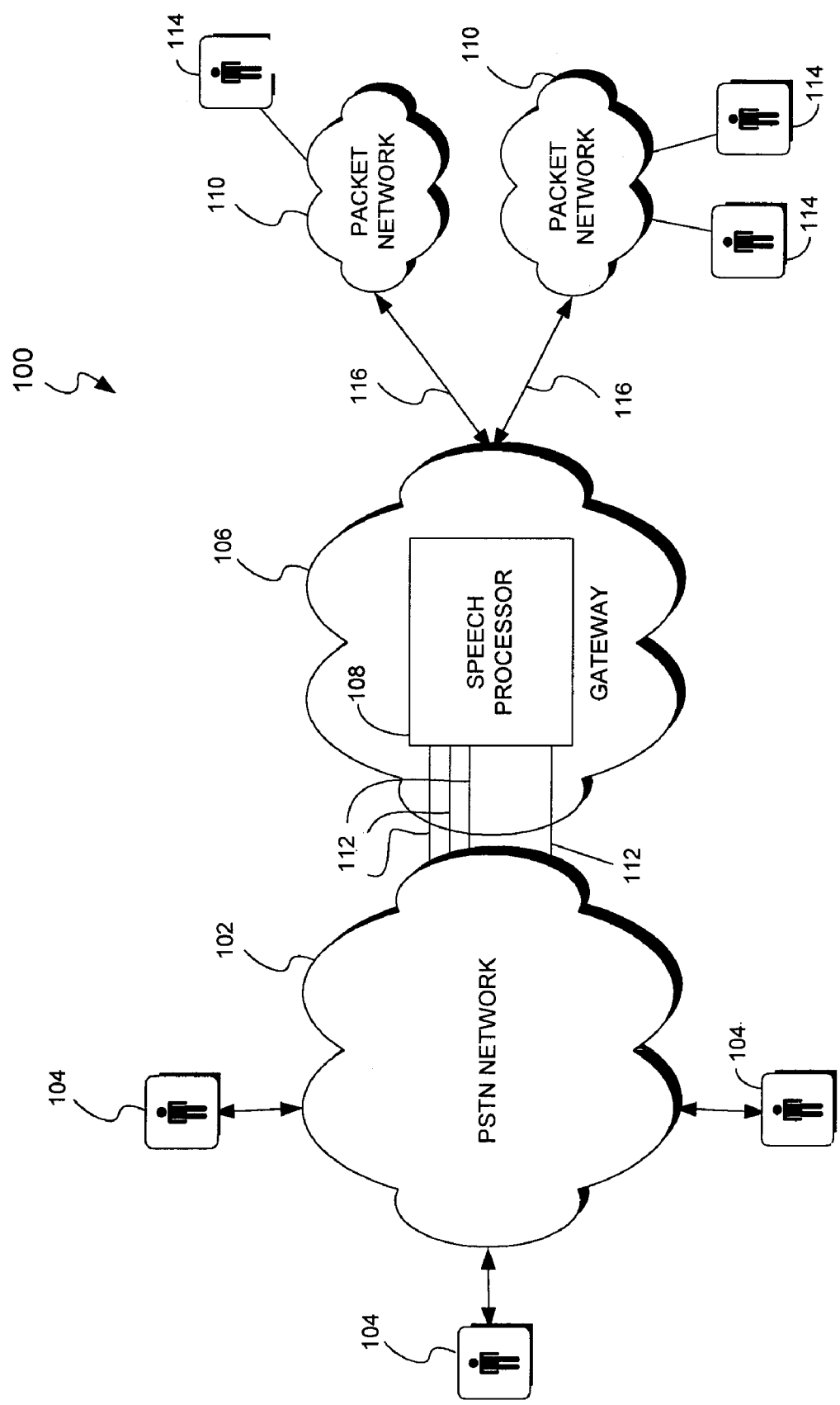
FIG. 1 illustrates a block diagram of a packet-based network in which various aspects of the present invention may be implemented.

FIG. 1 depicts an illustrative communication environment 100 that is capable of supporting the transmission of packetized voice information over transmission medium 116. Packet networks 110, such as those conforming to the Internet Protocol ("IP"), may support Internet telephony applications that enable a number of participants 104, 114 to conduct voice communication in accordance with VoP techniques. Network 102, which may be a non-packet network, such as switched network, or PSTN, supports telephone conversations between participants 104. In practical environment 100, network 102 may communicate with conventional telephone networks, local area networks, wide area networks, public branch exchanges, and/or home networks in a manner that enables participation by users that may have different communication devices and different communication service providers. In addition, in FIG. 1, participants 104 of network 102 may communicate with other participants 114 of other packet networks 110 via gateway 106 and transmission medium 116.

Speech processor 108 of gateway 106 converts voice information of participants 104 of network 102 into a packetized form that can be transmitted to the other packet networks 110. A gateway is a system which may be placed at the edge of the network in a central office or local switch (e.g., one associated with a public branch exchange), or the like. It is noted that in addition to speech encoding and decoding, the gateway performs various functions of receiving and transmitting information (speech samples) from the network 102, and receiving and transmitting information (speech packets) from the packet network (e.g., padding and stripping header information). The gateway also performs data (modem, fax) transmission and receiving functionalities. It will be appreciated that the present invention can be implemented in conjunction with a variety of gateway designs. A corresponding gateway and a speech processor (not shown) might also be associated with each of the other networks 110, and their operation is substantially the same manner as described herein for gateway 106 and speech processor 108 for encoding speech information into packet data for transmission to other packet networks. It is also possible that participants 114 generate packetized speech, where no gateway or additional speech processing is needed for the communication of participants 114 to the networks 110.

Speech processor 108 of gateway 106 also converts voice packets into an encrypted form which can be securely transmitted to other packet networks 110 and which cannot be understood by unauthorized users. Upon receipt, the encrypted voice data is decrypted into a form which can be understood by authorized users. As described more fully below, speech processor 108 of the present invention provides efficient encryption data handling for encrypted voice packet transmission, resulting in significantly improved VoP quality and performance.

Speech processor 108 is capable of interfacing with one or more communication channels via communication lines 112 for receiving speech signals as well as control signals in network 102. For example, speech signals from participants 104 are communicated via an appropriate channel for processing by speech processor 108 as described in further detail below. The output of speech processor 108 is then communicated by gateway 106 to the appropriate destination packet network.

Figure 2:
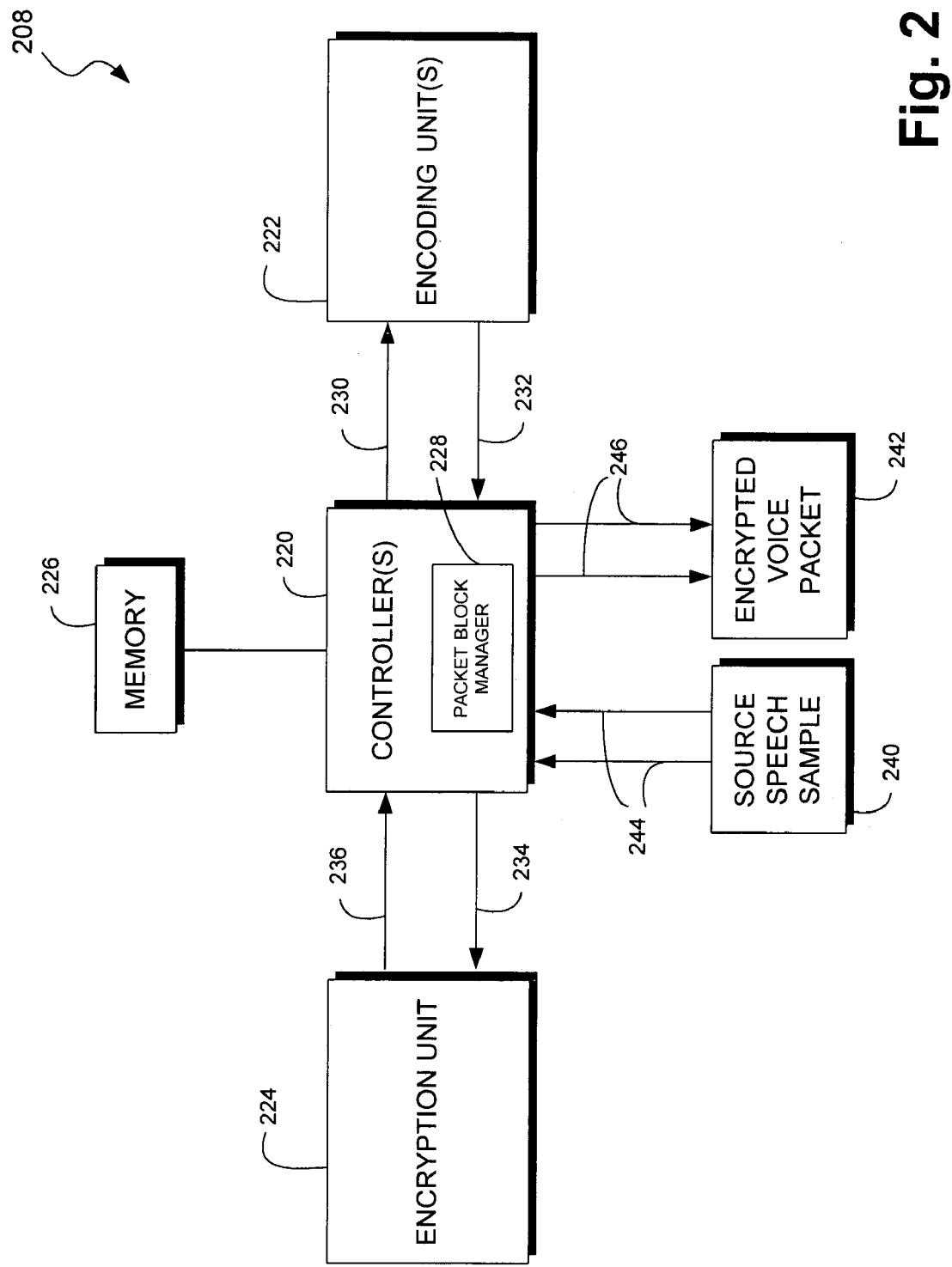
FIG. 2 illustrates a block diagram of an exemplary speech processor in accordance with one embodiment.

Referring now to FIG. 2, there is shown a block diagram of exemplary speech processor 208 providing encryption handling in accordance with one embodiment of the present invention. As described more fully below, speech processor 208 provides efficient data handling between encoding unit 222 and encryption unit 224, resulting in significantly improved VoP quality and performance. Speech processor 208 corresponds to speech processor 108 of FIG. 1, and comprises at least one controller 220 executing packet block manager ("PBM") 228. Controller 220 is coupled for communication to one or more encoding units 222, and at least one encryption unit 224. Controller 220 receives source speech samples 240 via one or more input lines 244, and generates encrypted voice packets 242 which are transmitted via corresponding output lines 246.

Controller 220 comprises a processor, such as an ARM® microprocessor, for example. In certain embodiments, a plurality of controllers 220 may be used to enhance speech processor's 208 performance. Similarly, a plurality of encoding units 222 may be used to provide increased performance and/or channel density of speech processor 208.

Memory 226 stores information accessed by controller 220. In particular, memory 226 stores input speech sample data which is processed by encoding unit 222, encoded voice packets after processing by encoding unit 222, and encrypted voice packets after processing by encryption unit 224.

It is noted that the arrangement of speech processor 208, as depicted in FIG. 2, is only illustrative and other arrangement for carrying out the operations of PBM 228 are suitable for use with present invention. For example, in other embodiments, the operations of PBM 228 may be carried out completely in encoding unit 222 or encryption unit 224. In yet other arrangements, the operations of PBM 228 may be distributed between controller 220, encoding unit 222, and/or encryption unit 224.

Figure 3:
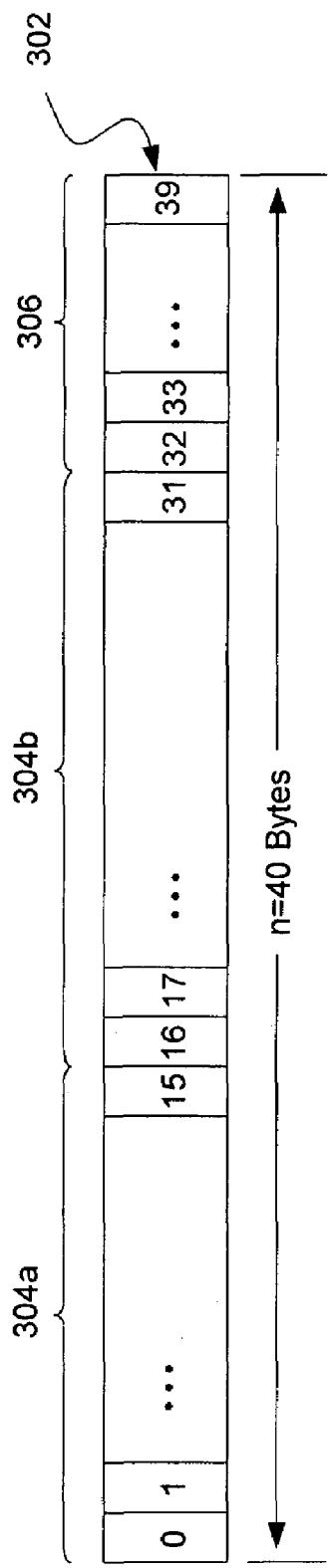
FIG. 3 illustrates an exemplary encoded voice packet in accordance with one embodiment.

Encoding unit 222 carries out the operation of converting source speech sample 240 into a packetized format using one of the coding rates of a speech codec. For example, encoding unit 222 may use one of a variable rate codec to convert input speech sample 240 received from controller 220 via line 230 into an encoded voice packet which is then transmitted to controller 220 via line 232 after processing by encoding unit 222. Any suitable algorithm may be used for determining which coding rate encoding unit 222 uses for this encoding process. As discussed above, depending on the coding rate and/or speech codec employed by encoding unit 222, the size of the encoded voice packet generated by encoding unit 222 may or may not be proportional to the input block size employed by encryption unit 224. By way of illustration, FIG. 3 illustrates encoded voice packet 302 generated by encoding unit 222 employing G.711 in a framing rhythm of 5 ms. As shown in FIG. 3, G.711 encoded voice packet 302 comprises 40 bytes (designated "n" in FIG. 3).

Figure 4:
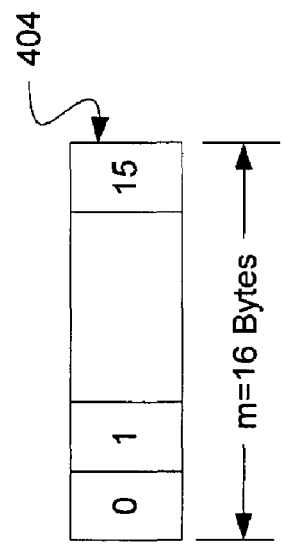
FIG. 4 illustrates an exemplary input voice block packet in accordance with one embodiment.

Continuing with FIG. 2, PBM 228 processes the encoded voice packet generated by encoding unit 222 into one or more blocks, each of which are transmitted to encryption unit 224 as an input voice block packet via line 234 and encrypted by encryption unit 224 into a form which cannot be understood by unauthorized users. The encrypted voice block packet generated by encryption unit 224 is subsequently transmitted by encryption unit 224 to controller 220 via line 236 for transmission by controller 220 via output line 246 to a designated receiver. By way of illustration, FIG. 4 illustrates exemplary input voice block packet 404, which can be processed by encryption unit 224 employing an encryption algorithm, such as the encryption algorithm described in Advanced Encryption Standard ("AES") of Federal Information Processing Standards Publication 197, Nov. 26, 2001, which is hereby incorporated by reference. As shown in FIG. 4, AES input voice block packet 404 comprises 16 bytes (designated "m" in FIG. 4), which is not proportional to the size n of G.711 encoded voice packet 302 of FIG. 3, which comprises 40 bytes. Flow chart 500 of FIG. 5 sets forth one exemplary embodiment of the encryption handling scheme employed by PBM 228 for managing data blocks between encoding unit 222 and encryption unit 224 according to one embodiment of the invention when a disparity arises between the size of the encoded voice packet generated by encoding unit 222 and the size of the input voice block packet required by encryption unit 224.

Figure 5:
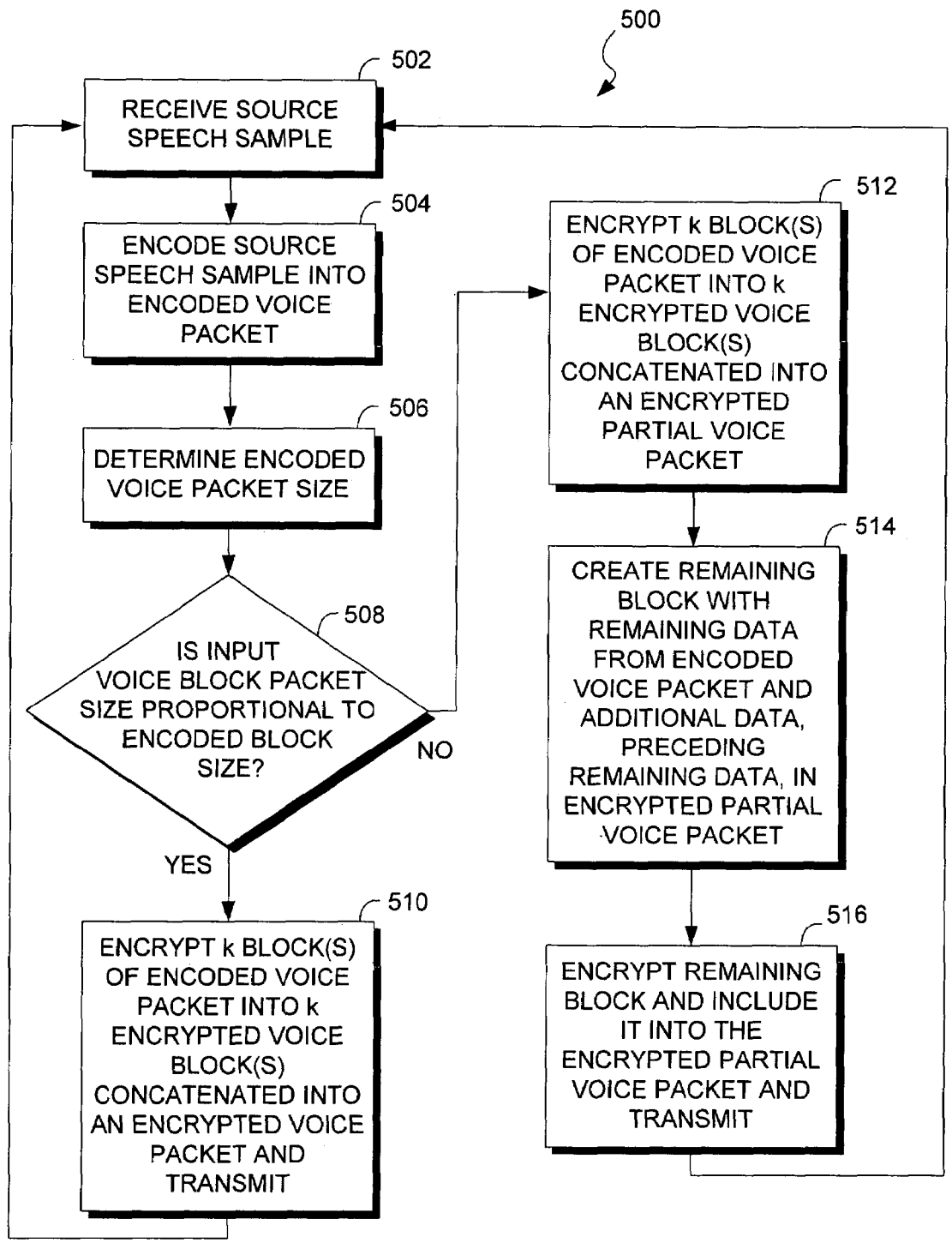
FIG. 5 depicts an illustrative flow diagram of an exemplary encryption handling operation carried out by a packet block manager in accordance with one embodiment.

Referring now to FIG. 5, there is shown flow chart 500 depicting an exemplary encryption handling process carried out by PBM 228 of FIG. 2 in accordance with one embodiment of the present invention. Certain details and features have been left out of flow chart 500 of FIG. 5 that are apparent to a person of ordinary skill in the art. For example, a step may consist of one or more sub-steps, as known in the art. While steps 502 through 516 shown in flow chart 500 are sufficient to describe one embodiment of the present invention, other embodiments of the invention may utilize steps different from those shown in flow chart 500.

Beginning at step 502, PBM 228 of controller 220 receives source speech sample 240 via one of input lines 244. The source speech sample 240 is transmitted to encoding unit 222 via line 230 for processing. At step 504, encoding unit 222 encodes speech sample 240 to convert input speech sample 240 into an encoded voice packet, which is then transmitted to controller 220 via line 232 after processing by encoding unit 222. By way of example, encoding unit 222 may encode input speech sample 240 into G.711 encoded voice packet 302 of FIG. 3 using G.711 codec.

At step 506, PBM 228 determines the size of the encoded voice packet generated by encoding unit 222 during step 504. Using the example illustrated in FIG. 3, G.711 encoded voice packet 302 comprises 40 bytes, designated bytes 0 through 39 in FIG. 3.

At decision step 508, PBM 228 then determines whether the input voice block packet size required by encryption unit 224 is proportional to the encoded voice packet size generated by encoding unit 222, i.e. whether the encoded voice packet size is divisible by encryption block size (or input voice block packet size). If so, step 510 is carried out as described below. Otherwise, step 512 is carried out as described below.

At step 510, PBM 228 processes one or more blocks (designated "k" blocks in FIG. 5) from the encoded voice packet generated by encoding unit 222, where each block is encrypted by encryption unit 224 into a corresponding encrypted voice block packet and concatenated into a single encrypted voice packet. Since the input voice block packet size for encryption unit 224 is proportional to the encoded voice packet size generated by encoding unit 222, every byte of the encoded voice packet can be processed using k number of blocks equal to the size of the input voice block packet size required by encryption unit 224. The encrypted voice packet is then transmitted via a corresponding line 246 by controller 220 to a designated receiver. Step 502 is repeated for processing the next input speech sample.

At step 512, PBM 228 processes one or more blocks (designated "k" blocks in FIG. 5) from the encoded voice packet generated by encoding unit 222, where each block is encrypted by encryption unit 224 into a corresponding encrypted voice block packet and concatenated into an encrypted partial voice packet. With continuing reference to the exemplary embodiment described above in conjunction with FIGS. 3 and 4, block 304a comprising bytes 0 through 15 of G.711 encoded voice packet 302 is processed as a first input voice block packet by encryption unit 224 and is encrypted into a first encrypted voice block packet. Similarly, block 304b comprising bytes 16 through 31 of G.711 encoded voice packet 302 is processed as a second input voice block packet by encryption unit 224 and is encrypted into a second encrypted voice block packet. The first and second encrypted voice block packets are concatenated to form the encrypted partial voice packet. However, since input voice block packet 404 size m for encryption unit 224 is not proportional to encoded voice packet 302 size n, a remaining set of data of G.711 encoded voice packet 302, designated as remainder 306 in FIG. 3, cannot be processed by encryption unit 224 to create a complete encrypted block. The number of bytes in remainder 306, which is also referred to as "Re", corresponds to the remainder resulting from the division of (n/m). Using exemplary input voice block packet 404 size of m=16 for AES encryption and exemplary G.711 encoded voice packet 302 size of n=40, remainder 306 corresponds to the last 8 bytes of G.711 encoded voice packet 302, or bytes 32-39 of G.711 encoded voice packet 302.

Figure 6:
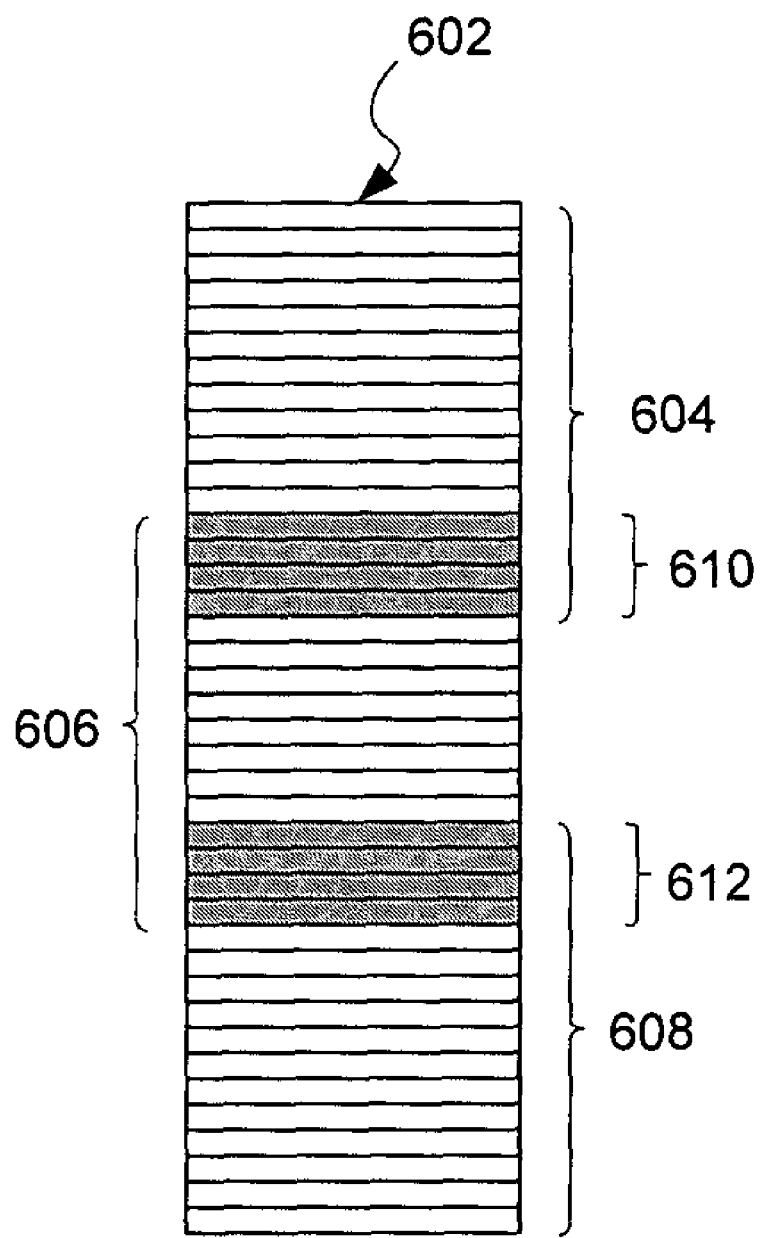
FIG. 6 illustrates an exemplary input voice block packet wherein a recursive overlapping block method algorithm has been employed in accordance with one embodiment.

At step 514, PBM 228 creates a remaining block comprising remainder 306 of G.711 encoded voice packet 302, and additional data from previous G.711 encrypted voice block packets based on G.711 encoded voice packet 302 such that the remaining block will achieve a size m equal to input voice block packet 404, e.g., 16 bytes as illustrated in FIG. 4. A number of techniques may be employed to determine the additional data from the G.711 encrypted voice block packets which forms a portion of the remaining block. For example, one technique may be to use the bytes immediately preceding remainder 306, i.e., bytes 24-31, as additional bytes to complete an encrypted block with bytes 32-39 of remainder 306. Another approach may be to employ a mask that selects certain bytes, preceding the bytes of remainder 306, from G.711 encoded voice packet 302 to complete remainder block. In yet another approach, PBM 228 may apply a sliding (or overlapping) block method to select byte block recursive encryption between one or more blocks within the current encoded voice packet. By way of example, FIG. 6 shows exemplary G.711 encoded voice packet 602 wherein a recursive overlapping block method algorithm has been employed to select byte blocks 604, 606 and 608, where byte blocks 604 and 606 overlap in byte region 610, and where byte blocks 606 and 610 overlap in byte region 612.

At step 516, the remaining block generated during step 514 is encrypted by encryption unit 224 and is included into the encrypted partial voice packet generated during step 512 to form a resulting encrypted voice packet, which is transmitted via a corresponding output line 246 by controller 220 to a designated receiver. Step 502 is repeated for processing the next input speech sample.

The encrypted voice packets generated in this manner are secure when communicated over packet networks and cannot be understood by unauthorized users. Upon receipt by authorized users, however, the encrypted voice packets can be decrypted, decoded, and understood. In processing each input speech sample 240 as described above according to flow chart 500, encryption handling for VoP is significantly improved. For one, speech encoder 208 is able to encrypt each encoded voice packet based on a single encoded voice packet and a single input speech sample, and without having to wait for a second/subsequent encoded voice packet nor a second/subsequent input speech sample. As a result, the waiting process delay discussed above associated with overlapping voice data using two successive encoded voice packets can be avoided, resulting in efficient encrypted voice packet transmission. Furthermore, since the receiver is able to process the encrypted voice packets associated with a single encoded voice packet without having to wait for encrypted voice packets associated with two consecutive encoded voice packets, the waiting delay for the receiving process is also significantly reduced. Moreover, since overlap packets (comprising voice data from two or more encoded voice packets) are not required, packet loss is also reduced since a lost encrypted voice packet only affects a single encoded voice packet, namely the encoded voice packet associated with the lost packet. In sum, speech encoder 208 operating in accordance with flow chart 500 results in significantly improved encryption data handling for voice data over packet networks and further in improved encrypted VoP quality and performance.

The methods and systems presented above may reside in software, hardware, or firmware on the device, which can be implemented on a microprocessor, digital speech processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A device comprising:
    an encoder configured to receive a speech sample and generate an encoded voice packet from said speech sample, said encoded voice packet having a packet size and a plurality of bytes;
    an encryption unit configured to receive a voice block and generate an encrypted voice block, said voice block having a block size, wherein said packet size is not divisible by said block size and yields a remainder; and
    a packet block manager configured to divide said encoded voice packet into a plurality of first voice blocks each having said block size, and provide said plurality of first voice blocks to said encryption unit, said packet block manager further configured to create a remainder voice block having said block size and including remainder bytes of said encoded voice packet, wherein the packet block manager is further configured to employ a pre-determined technique for selecting additional bytes from said plurality of first voice blocks, and further configured to include said additional bytes selected from said plurality of first voice blocks in said remainder voice block following said remainder bytes in said remainder voice block and provide said remainder voice block to said encryption unit.

2. The device of claim 1, wherein said pre-determined technique employed by said packet block manager applies a mask to select said additional bytes from said plurality of first voice packets.

3. The device of claim 1, wherein said encoder is a G.711 encoder.

4. The device of claim 1, wherein said encryption unit employs Advanced Encryption Standard encryption.

5. A method comprising:
    generating an encoded voice packet from a speech sample, said encoded voice packet having a packet size and a plurality of bytes;
    dividing said encoded voice packet into a plurality of first voice blocks each having a block size, wherein said packet size is not divisible by said block size and yields a remainder;
    creating a plurality of first encrypted voice blocks from said plurality of first voice blocks;
    creating a remainder voice block having said block size and including remainder bytes;
    selecting additional bytes from said plurality of first voice blocks by applying a pre-determined technique to said plurality of first voice blocks;
    including said additional bytes selected from said plurality of first voice blocks in said remainder voice block following said remainder bytes in said remainder voice block; and
    creating an encrypted remainder voice block from said remainder voice block.

6. The method of claim 5, wherein applying the pre-determined technique includes applying a mask to select said additional bytes from said plurality of first voice packets.

7. The method of claim 5, wherein said generating said encoded voice packet uses a G.711 encoder.

8. The method of claim 5, wherein said creating said encrypted voice block employs Advanced Encryption Standard encryption.

9. A computer software product for execution by a controller, the computer software product comprising:
- code for generating an encoded voice packet from a speech sample, said encoded voice packet having a packet size and a plurality of bytes;
- code for dividing said encoded voice packet into a plurality of first voice blocks each having a block size, wherein said packet size is not divisible by said block size and yields a remainder;
- code for creating a plurality of first encrypted voice blocks from said plurality of first voice blocks;
- code for creating a remainder voice block having said block size and including remainder bytes;
- code for selecting additional bytes from said plurality of first voice blocks by applying a pre-determined technique to said plurality of first voice blocks;
- code for including said additional bytes selected from said plurality of first voice blocks in said remainder voice block following said remainder bytes in said remainder voice block; and
- code for creating an encrypted remainder voice block from said remainder voice block.

10. The computer software product of claim 9, wherein code for applying the pre-determined technique includes code for applying a mask to select said additional bytes from said plurality of first voice packets.

11. The computer software product of claim 9, wherein said code for generating said encoded voice packet uses a G.711 encoder.

12. The computer software product of claim 9, wherein said code for creating said encrypted voice block employs Advanced Encryption Standard encryption.

* * * * *